(12) United States Patent
Hans et al.

(10) Patent No.: US 11,659,622 B2
(45) Date of Patent: May 23, 2023

(54) DIRECTED FORWARDING INFORMATION SHARING BETWEEN DEVICES IN A MESH NETWORK

(71) Applicant: QUALCOMM Incorporated, San Diego, CA (US)

(72) Inventors: Jagdeep Kumar Hans, Bangalore (IN); Vishal Agarwal, Ramnagar (IN)

(73) Assignee: QUALCOMM INCORPORATED, San Diego, CA (US)

( * ) Notice: Subject to any disclaimer, the term of this patent is extended or adjusted under 35 U.S.C. 154(b) by 84 days.

(21) Appl. No.: 16/946,454

(22) Filed: Jun. 23, 2020

(65) Prior Publication Data

US 2021/0022207 A1 Jan. 21, 2021

(30) Foreign Application Priority Data

Jul. 16, 2019 (IN) .............................. 201941028562

(51) Int. Cl.
*H04W 84/18* (2009.01)
*H04L 45/02* (2022.01)
*H04W 40/02* (2009.01)
*H04W 40/24* (2009.01)

(52) U.S. Cl.
CPC ............. *H04W 84/18* (2013.01); *H04L 45/02* (2013.01); *H04W 40/02* (2013.01); *H04W 40/246* (2013.01)

(58) Field of Classification Search
CPC ........ H04W 84/18; H04W 40/02; H04L 45/02
See application file for complete search history.

(56) References Cited

U.S. PATENT DOCUMENTS

| 10,567,282 B2* | 2/2020 | Di Marco ............... H04L 45/74 |
| 2017/0230784 A1 | 8/2017 | Kwon et al. |
| 2017/0272329 A1* | 9/2017 | Bennett ................... H04L 49/90 |

FOREIGN PATENT DOCUMENTS

| WO | 2018017009 A1 | 1/2018 |
| WO | 2018236265 A1 | 12/2018 |

OTHER PUBLICATIONS

ST Microelectronics STSW-BNRG-Mesh Friend and Low Power Features Feb. 2019 AN 5285 (Year: 2019).*
International Search Report and Written Opinion—PCT/US2020/070232—ISA/EPO—dated Oct. 19, 2020.
Ren K., "Bluetooth Mesh Networking: Friendship | Bluetooth Technology Website", Aug. 24, 2017 (Aug. 24, 2017), pp. 1-10, XP055503248, Retrieved from the Internet: URL:http://blog.bluetooth.com/bluetooth-mesh-networking-series-friendship [retrieved on Aug. 29, 2018]p. 4, line 5-p. 5, line 19.
Snellman H., et al., "Bluetooth Mesh: Wireless Technology for the World of IoT", Aug. 15, 2017 (Aug. 15, 2017), 24 pages, XP055526117, Retrieved from the Internet: URL: https://www.engineeringwhitepapers.com/bluetooth/bluetooth-mesh-wireless-technology-world-iot/,[retr . . . on Nov. 22, 2018].

* cited by examiner

*Primary Examiner* — Kevin M Cunningham
(74) *Attorney, Agent, or Firm* — Kevin T. Cheatham

(57) ABSTRACT

A method for wireless communications in a mesh network at a first device is disclosed. The method includes receiving, during a friendship termination procedure, direct forwarding information from a second device and storing the directed forwarding information from the second device. The method also includes terminating the friendship with the second device and establishing a friendship with a third device. The method also includes transmitting the directed forwarding information to the third device.

28 Claims, 8 Drawing Sheets

DIRECTED FORWARDING INFORMATION SHARING BETWEEN DEVICES IN A MESH NETWORK

PRIORITY

The present Application for Patent claims priority to Indian Application No. 201941028562 entitled "DIRECTED FORWARDING INFORMATION SHARING BETWEEN DEVICES IN A MESH NETWORK" filed Jul. 16, 2019, and assigned to the assignee hereof and hereby expressly incorporated by reference herein.

TECHNICAL FIELD

The various aspects described herein generally relate to wireless communications, and in particular, to directed forwarding information sharing between devices in a mesh network.

BACKGROUND

All wireless networking technologies generally have a limited range. However, there are many environments in which devices that are otherwise outside communication range of each other can need to communicate using a reliable low-power wireless technology. For example, the Internet of Things (IoT) is based on the idea that everyday devices can be read, recognized, located, addressed, and otherwise controlled via an IoT communications network (e.g., an ad-hoc system or the Internet).

One way to address issues that arise when devices are outside a maximum communication range of each other is to implement a mesh network which has a topology where all devices can communicate with each other directly or indirectly. For example, two devices that are in radio range can communicate directly, whereas communication with devices located outside radio range of each other can be achieved via one or more intermediate "relay" nodes. Mesh networks can therefore offer multiple paths to route a message from a source to a destination resulting in greater reliability relative to other networks that tend to flow all traffic through a central hub (e.g., a router or gateway).

A wireless mesh network can generally refer to a network in which various devices or "nodes" have the ability to receive and act upon messages, in addition, to having the ability to repeat or relay the messages to surrounding devices or nodes that are within radio range. The mesh architecture can therefore extend the effective radio range associated with whatever wireless technology is used to convey the messages, and thereby can be used to implement the IoT and other suitable use cases that are built at least in part on wireless communications. The efficiency of a mesh network can be improved by the use of Directed Forwarding which enables a source node to communicate information to a specific destination node. Accordingly, there exists a need for efficient and improved information sharing between nodes in a mesh network.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect of the present disclosure, a method for wireless communications in a mesh network at a first device is described. The method includes receiving, during a friendship termination procedure, directed forwarding information from a second device. The method also includes storing the directed forwarding information from the second device and terminating the friendship with the second device. The method also includes establishing a friendship with a third device and transmitting the directed forwarding information to the third device.

The first device can be a low power node (LPN) or a proxy node. The second device and third device can be a friend node or a proxy server node. The directed forwarding information includes at least a directed forwarding table and a neighboring information table.

In one implementation, the first device stores the directed forwarding information from the second device by updating at least a portion of a directed forwarding table and at least a portion of a neighboring information table stored in the first device. The first device terminating the friendship with the second device includes transmitting at least one friend poll message to the second device and receiving no response to the at least one friend poll message from the second device.

In another implementation, the first device can establish a friendship with a third device which includes transmitting a friend request message to the third device. The first device receiving a friend offer message from the third device. The first device transmitting a friend poll message to the third device and receiving a friend update message from the third device.

In another implementation, the first device transmits the directed forwarding information to the third device which includes transmitting at least a portion of a directed forwarding table and at least a portion of a neighboring information table stored in the first device. In another implementation, the second device, that was in previous friendship with the first device, can transmit the directed forwarding information to the third device.

In another aspect of the present disclosure, a first device for wireless communications in a mesh network is described. The first device includes a memory and at least one processor coupled to the memory and configured to receiving, during a friendship termination procedure, directed forwarding information from a second device. The first device storing the directed forwarding information from the second device and terminating the friendship with the second device. The first device establishing a friendship with a third device and transmitting the directed forwarding information to the third device.

In another aspect of the present disclosure, a first device for wireless communications in a mesh network is described. The first device includes means for receiving, during a friendship termination procedure, directed forwarding information from a second device. The first device includes means for storing the directed forwarding information from the second device and means for terminating the friendship with the second device. The first device also includes means for establishing a friendship with a third device and means for transmitting the directed forwarding information to the third device.

In another aspect of the present disclosure, a non-transitory computer-readable medium storing code for wireless communication at a first device is described. The code comprising instructions executable by a processor to receiving, during a friendship termination procedure, directed forwarding information from a second device, storing the directed forwarding information from the second device, terminating the friendship with the second device, establishing a friendship with a third device and transmitting the directed forwarding information to the third device.

In another aspect of the present disclosure, a method for wireless communications in a mesh network at a first device is described. The method includes establishing, during a friendship establishment procedure, a friendship with a second device. The method also includes accessing directed forwarding information stored on the first device and transmitting the directed forwarding information to a second device.

The first device can be a low power node (LPN) or a proxy node. The second device can be a friend node or a proxy server node. The directed forwarding information includes at least a directed forwarding table and a neighboring information table.

In one implementation, the first device establishes a friendship with the second device. The first device transmitting a friend request message to the second device. The first device receiving a friend offer message from the second device. The first device transmitting a friend poll message to the second device and receiving a friend update message from the second device.

The first device transmitting the directed forwarding information to the second device includes transmitting at least a portion of a directed forwarding table and at least a portion of a neighboring information table stored in the first device.

In another aspect of the present disclosure, a first device for wireless communications in a mesh network described. The first device includes a memory and at least one processor coupled to the memory and configured to establishing, during a friendship establishment procedure, a friendship with a second device, accessing directed forwarding information stored on the first device, and transmitting the directed forwarding information to a second device.

In another aspect of the present disclosure, a first device for wireless communications in a mesh network described. The first device includes means for establishing, during a friendship establishment procedure, a friendship with a second device. The first device also includes means for accessing directed forwarding information stored on the first device and means for transmitting the directed forwarding information to a second device.

In another aspect of the present disclosure, a non-transitory computer-readable medium storing code for wireless communication at a first device is described. The code comprising instructions executable by a processor to establishing, during a friendship establishment procedure, a friendship with a second device, accessing directed forwarding information stored on the first device, and transmitting the directed forwarding information to a second device.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
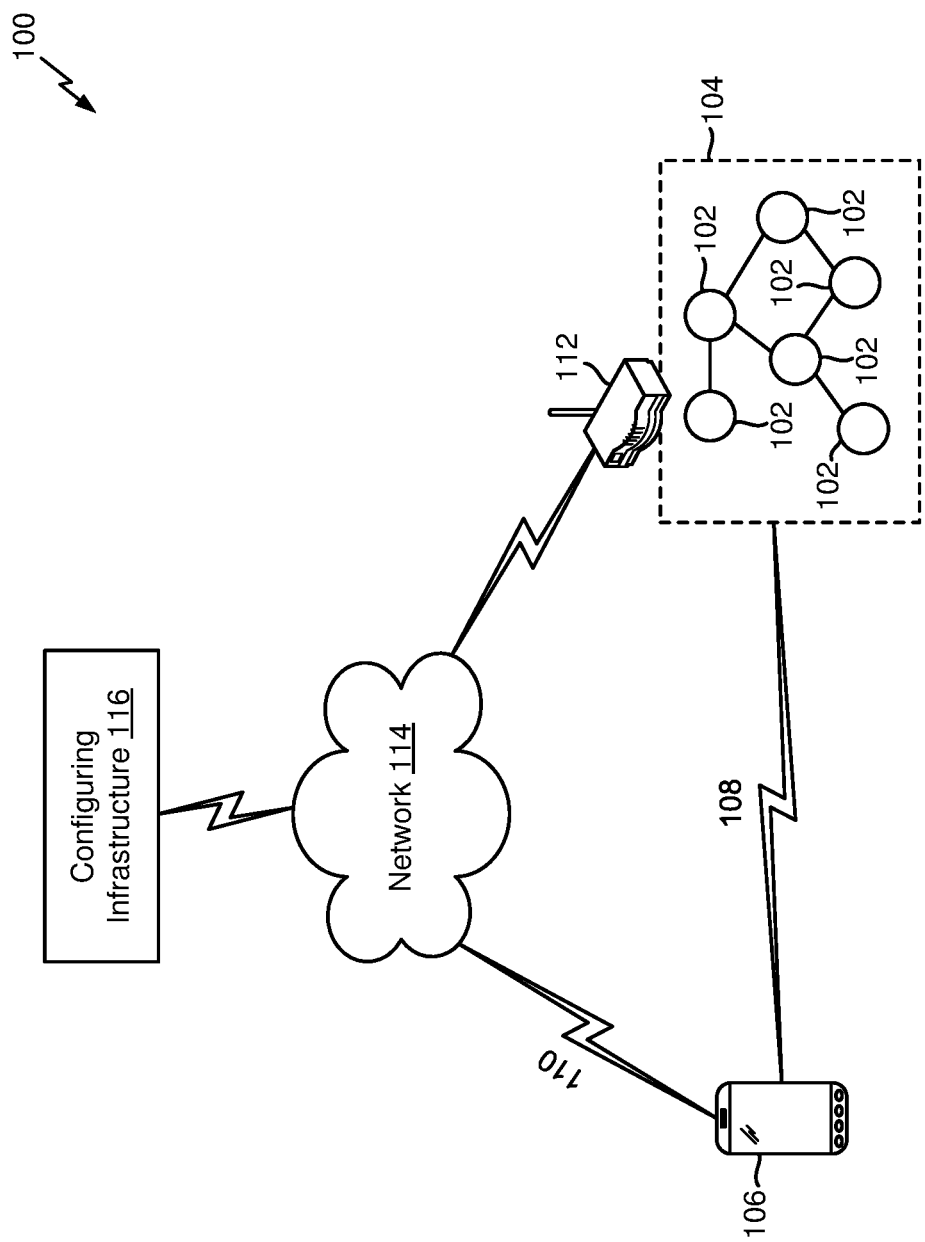
FIG. 1 is a block diagram illustrating one configuration of a wireless mesh network.

Aspects of the disclosure are provided in the following description and related drawings directed to various examples provided for illustration purposes. Alternate aspects can be devised without departing from the scope of the disclosure. Additionally, well-known aspects of the disclosure may not be described in detail or may be omitted so as not to obscure more relevant details.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "node" refers to a mobile or stationary device that is a member of a wireless mesh network. A node may be a cellular telephone, a "smart phone," a personal or mobile multimedia player, a personal data assistant, a laptop computer, a desktop computer, a tablet computer, a wireless gaming controller, an IoT device (e.g., a "smart" thermostat, refrigerator, microwave, speaker system, meter, etc.), and similar devices with a programmable processor, memory, and circuitry to connect to and communicate over a radio access network (RAN) that implements a particular radio access technology (RAT) over a wired network, over a wireless local area network (WLAN) (e.g., based on IEEE 802.11, etc.), and/or with other devices via a direct device-to-device (D2D) or peer-to-peer (P2P) connection (e.g., a Bluetooth connection).

The efficiency of a mesh network can be improved by the use of Directed Forwarding which enables a source node to communicate information to a specific destination node. When Directed Forwarding is implemented in a mesh network, there are certain requirements that need to be met when it comes to the nodes being standard powered (i.e., wall powered) or battery powered. Directed Forwarding requires that nodes have the ability to keep track of certain information pertaining to other nodes. For example, a battery powered node as known as a Low Power Node (LPN) will attempt to conserve battery powered when in use. Due to the need to conserve power with an LPN, the concept of a friendship has been developed when implementing Directed Forwarding. A friendship is when an LPN partners with at least one other node known as a Friend node. The LPN establishes a friendship with a Friend node which allows the Friend node to receive messages and path destinations on behalf of the LPN. This allows the LPN to go into a sleep or a low power mode so it can conserve battery power. If the friendship ends between the LPN and the Friend node, then certain problems can occur since the LPN may not receive the necessary information from the Friend node to continue to operate properly. Accordingly, there exists a need for efficient and improved information sharing between nodes in a mesh network.

FIG. 1 is a block diagram illustrating one configuration of a wireless mesh network. The example wireless mesh network 100 can include various nodes 102, which can optionally be organized as a group 104, a controller 106 (e.g., a mobile device), a gateway 112, and a configuring infrastructure 116 in communication via a network "cloud" 114 (e.g., the Internet). Although the controller 106 and the gateway 112 are shown as elements separate from the nodes 102, the controller 106 and/or the gateway 112 can be included among the nodes 102. In general, the nodes 102 can be the basic building blocks of the wireless mesh network 100. The nodes 102 can be any suitable device that can be configured to send, receive, and relay messages to surrounding nodes 102 (i.e., devices). Message communication among the nodes 102 can generally be based on broadcast messages which can be transmitted via one or more wireless channels.

The controller 106 (which can also be referred to as a provisioner node) can be configured to establish a wireless connection 108 with the nodes 102. The controller 106 can use a wireless radio to communicate with the nodes 102 in the wireless mesh network 100. The controller 106 can have an additional communication path 110 to the wireless mesh network 100. For example, the controller 106 can use a configuring application to communicate with the configuring infrastructure 116 via the additional communication path 110 (e.g., via a web console or service). The configuring infrastructure 116 can service configuration commands received from the controller 106 (e.g., to securely distribute a network key to a new node 102, to program a particular node 102 to be within the group 104 or another group, etc.). The gateway 112 (e.g., an access point) can link the various nodes 102 to the network 114 and allow command and control over a local area network (LAN) or wireless LAN (WLAN) to which the gateway 112 is connected. Like other elements in the wireless mesh network 100, the gateway 112 can also use a wireless radio to communicate with the various nodes 102 via a wireless channel. The wireless mesh network 100 can enable the nodes 102 to send, receive, and/or relay messages (e.g., command and control operations), which can originate at one or more of the nodes 102 and/or be received from the controller 106 via the wireless connection 108 or from the gateway 112 via the additional communication path 110 between the controller 106 and the nodes 102.

The nodes 102, the controller 106, and the gateway 112 can be configured to communicate with one another via a wireless mesh protocol, which can generally enable devices to send, receive, and relay messages to surrounding devices located within radio range, thus forming an ad-hoc mesh network. For example, message communication can be based on broadcast messages transmitted and received via one or more wireless channels (e.g., Bluetooth broadcast channel) where each node 102 that receives a broadcast message can accept and forward the message to other nodes 102 within radio range. In this manner, the range over which the nodes 102 can communicate can be easily extended, as one or more intermediate nodes 102 can be used to relay a message to another node 102 that is otherwise located outside radio range of the originating node 102. The wireless mesh protocol can enable the wireless mesh network 100 to be easily extended to accommodate new devices which can also increase the geographic coverage of the wireless mesh network 100 depending on device placement. The wireless mesh protocol can be used to support various different use cases that are built, at least in part, on point-to-point, point-to-multipoint, and/or other suitable wireless communications.

Figure 2:
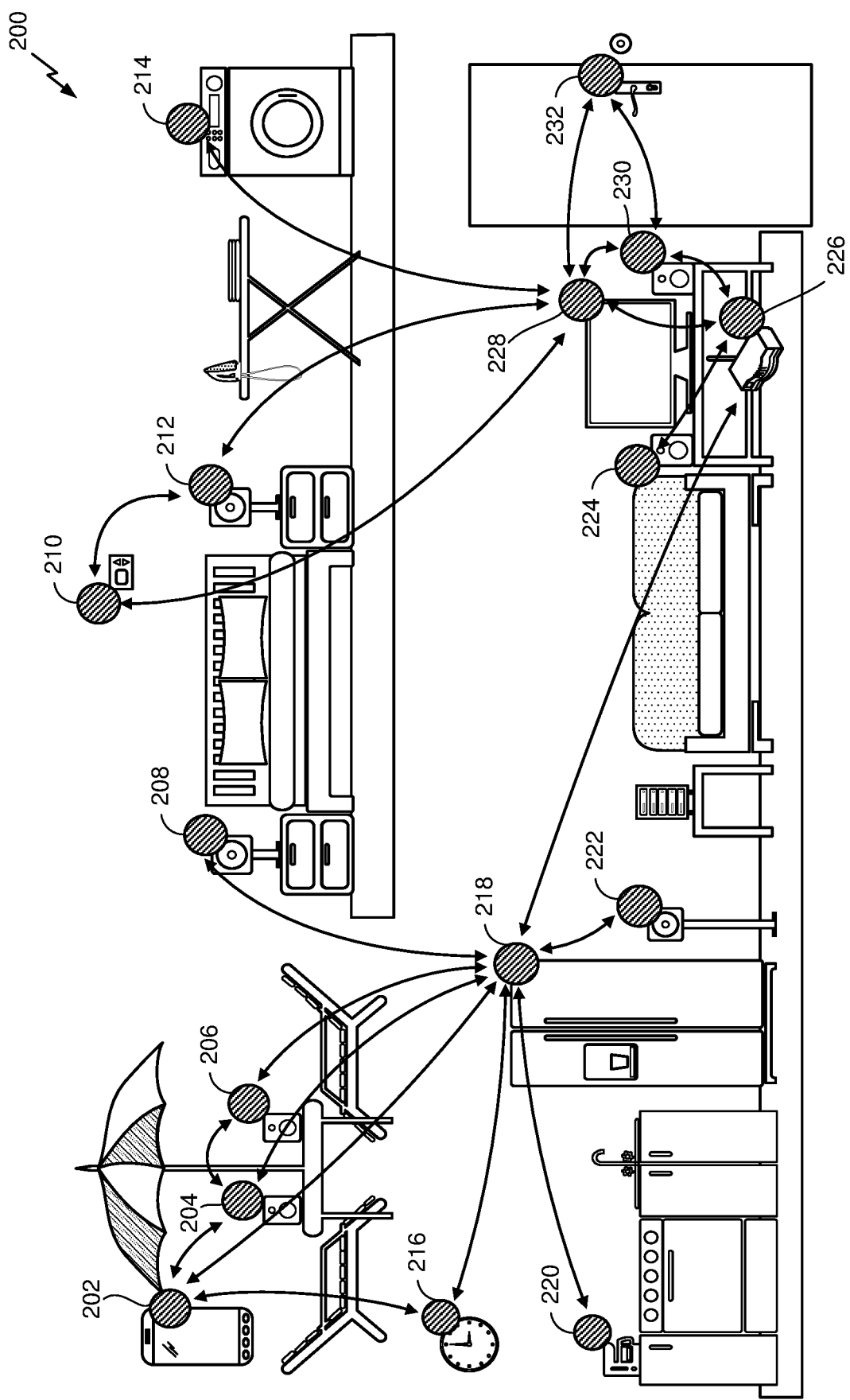
FIG. 2 is a block diagram illustrating one configuration of a wireless mesh network implemented in an example residential environment.

FIG. 2 is a block diagram illustrating one configuration of a wireless mesh network implemented in an example residential environment. In the environment 200 shown in FIG. 2, the wireless mesh network supports a home automation or an IoT use case, where home appliances, lights, electrical switches, thermostats, etc. can form a wireless mesh network and be controlled via the wireless mesh protocol, either directly using one or more user devices or indirectly via a gateway device in communication with the one or more user devices (e.g., a smartphone, a laptop computer, etc.). For example, the residential environment 200 as shown in FIG. 2 includes a smartphone 202 (which can correspond to controller 106), outdoor speakers 204 and 206, bedroom speakers 208 and 212, a thermostat 210, a laundry machine 214, a clock 216, a refrigerator 218, a coffee machine 220, a kitchen speaker 222, family room speakers 224 and 230, a television 228, an electronic lock 232, and a home gateway device 226 (which can correspond to gateway 112 in FIG. 1). The various devices can communicate with other devices within sufficient range (e.g., via broadcast messages) and the messages can be received and relayed as appropriate to ensure that the messages reach the intended destination. For example, a user can press a button on the smartphone 202 to engage the electronic lock 232 which is located outside radio range from the smartphone 202. However, the smartphone 202 is within radio range from the outdoor speakers 204 and 206, the clock 216, and the refrigerator 218. The smartphone 202 can broadcast a message containing a command to engage the electronic lock 232. The outdoor speakers 204 and 206, the clock 216, and the refrigerator 218 can each relay the message until the message eventually reaches the electronic lock 232.

Figure 3:
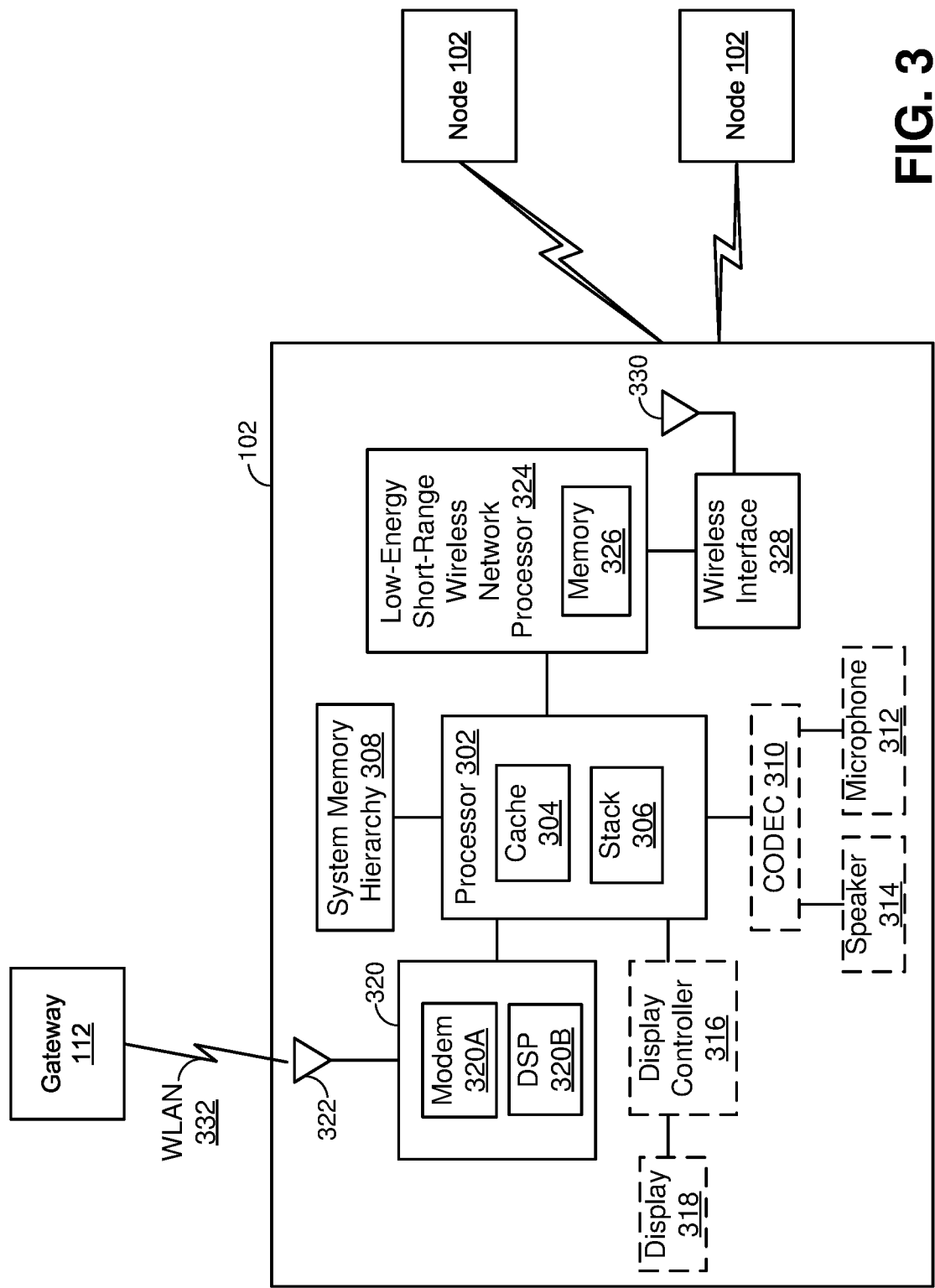
FIG. 3 is a block diagram illustrating one configuration of a node that can operate within a wireless mesh network.

FIG. 3 is a block diagram illustrating one configuration of a node 102 that can operate within a wireless mesh network. Processor 302 for the node 102 runs applications that cause the node 102 to perform the functionality described in this disclosure and includes a cache memory 304 along with a system memory hierarchy 308. The system memory hierarchy 308 acts as an interface to store and retrieve data and instructions from off-chip memory. The system memory hierarchy 308 can include various volatile and non-volatile memory systems.

The node 102 is capable of interfacing with wireless local area networks by way of a transceiver 320 and an antenna 322. The transceiver 320 includes a modem 320A and a digital signal processor (DSP) 320B, although in practice other kinds of modules can be employed, all or some such modules can be integrated on a single chip, and some of the modules can be integrated with the processor 302. In one implementation, the node 102 has a WLAN link 332 to the gateway 112 which can provide access to the network 114 (not shown).

The processor 302 can implement a low-energy short-range wireless network protocol stack 306 such as a Bluetooth Low Energy (BLE) protocol stack or a Bluetooth mesh protocol stack. The instructions for performing some or all of the low-energy short-range wireless network protocol stack 306 are stored in the system memory hierarchy 308. However, in the example of FIG. 3, a separate chip or an embedded hardware core, shown as a low-energy short-range wireless network processor 324, implements the portions of the low-energy short-range wireless network protocol stack 306 to perform the low-energy short-range wireless network operations. The low-energy short-range wireless network processor 324 includes a memory 326, shown as an on-chip memory, although the memory 326 can be part of a memory hierarchy in which some memory also resides off-chip. The wireless interface 328 provides an interface to the antenna 330 suitable for operating in the designated frequency spectrum utilized by the low-energy short-range wireless network. Communication can be made to any number of low-energy short-range wireless network capable devices such as one or more other nodes 102. The instructions for implementing some or all of the low-energy short-range wireless network operations described in this disclosure can be stored in memory 326. The memory 326 can be referred to as a non-transitory computer-readable medium.

The node 102 includes both a transceiver 320 that permits the node 102 to act as an access terminal to the gateway 112 and a low-energy short-range wireless network processor 324 and wireless interface 328 that together permit the node 102 to act as a low-energy mesh network node in a low-energy mesh network such as wireless mesh network 100. For example, the node 102 can receive information for another node 102 from the gateway 112 via the transceiver 320. The node 102 can establish a connection with all downlink nodes 102 and transmit the information in one or more data packets to the downlink nodes 102 using the low-energy short-range wireless network processor 324 and wireless interface 328.

The node 102 can optionally include a user interface. The node 102 can include a CODEC (Coder-Decoder) 310 for interfacing with a microphone 312 and a speaker 314. A display controller 316 provides an interface to a display 318 so that the user can interact with the node 102.

In one implementation, the low-energy short-range wireless network processor 324, as directed by instructions stored in memory 326, can cause the node 102 to perform the operations in this disclosure. For example, the low-energy short-range wireless network processor 324, the memory 326, and the wireless interface 328 can all be used cooperatively to load, store, and execute the various operations allowing the logic to perform these operations to be distributed over various elements. In another example, the functionality could be incorporated into one discrete component (e.g., the low-energy short-range wireless network processor 324).

Nodes 102 in a mesh network (e.g., wireless mesh network 100) can communicate with each other using various wireless communication protocols, such as Zigbee, Thread, Bluetooth, Bluetooth Low Energy, magnetic communications, near-field communication (NFC), near field magnetic induction (NFMI) communication, near ultra-low energy field (NULEF) communication, Wi-Fi (802.11), and related wireless communication protocols. The Bluetooth protocol used for mesh networks is referred to as "Bluetooth mesh" and is described in various publicly available specifications from the Bluetooth Special Interest Group (SIG). Bluetooth mesh builds on the Bluetooth Low Energy (BLE) protocol, which is described in various publicly available specifications from the Bluetooth SIG.

Figure 4:
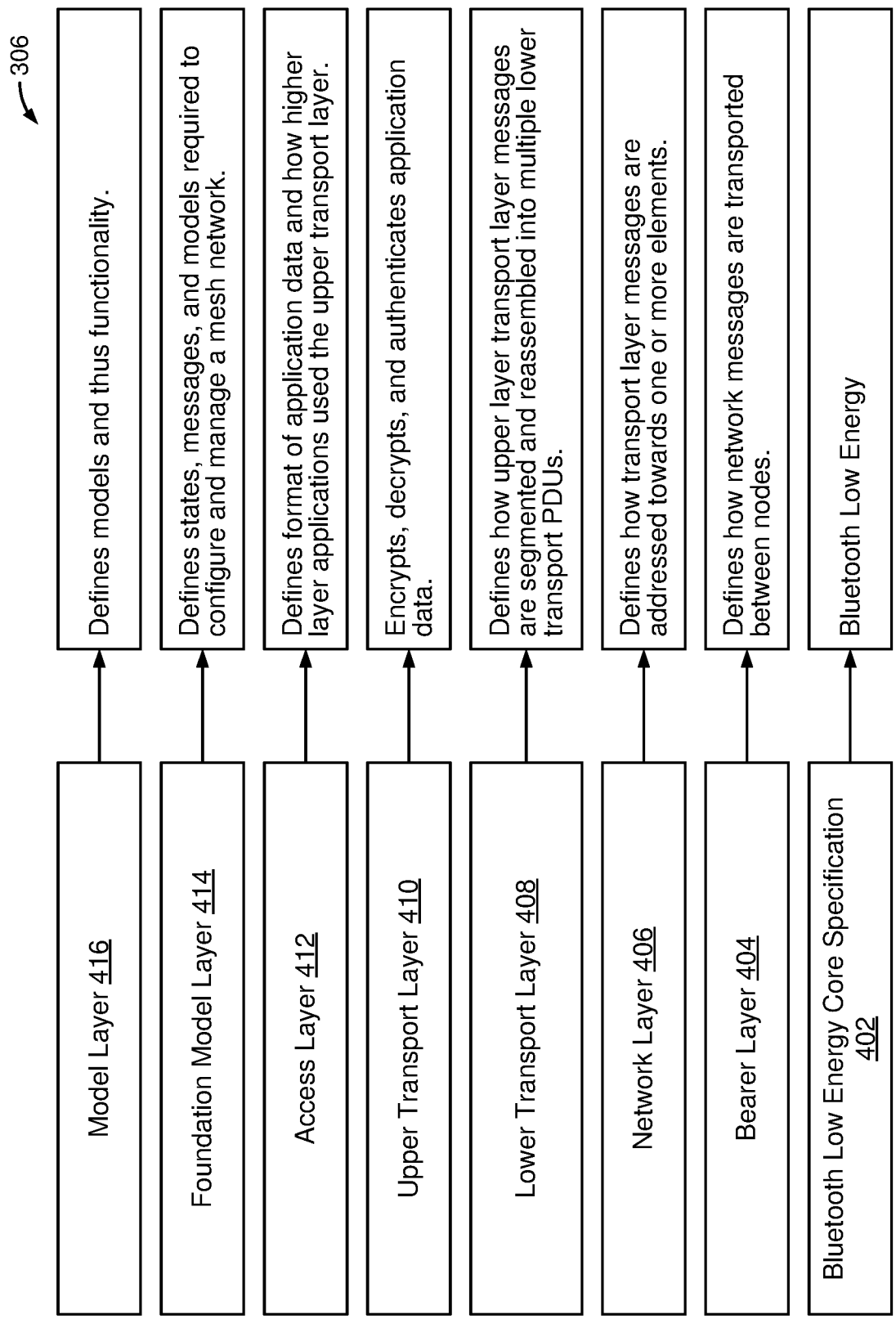
FIG. 4 is a block diagram illustrating the layers of the Bluetooth Mesh stack.

FIG. 4 is a block diagram illustrating the layers of the Bluetooth Mesh stack. On top of the BLE Core Specification layer 402, the Bluetooth mesh stack includes a bearer layer 404, a network layer 406, a lower transport layer 408, an upper transport layer 410, an access layer 412, a foundation model layer 414, and a model layer 416. When a Bluetooth mesh node (e.g., node 102) receives a message, it passes the message up the layers from the underlying BLE stack (i.e., BLE Core Specification layer 402) via the bearer layer 404 to the network layer 406. The network layer 406 applies various checks to decide whether to pass the message to the transport layers 408 and 410 or discard it.

Bluetooth mesh uses four types of nodes including Relay Nodes, Low Power Nodes (LPNs), Proxy Nodes, and Friend Nodes. Relay Nodes receive and forward messages across the mesh network. Relay Nodes generally remain in an active or awake mode which significantly increases power consumption. This is not a disadvantage for standard powered applications (where the node is hardwired or plugged in to a power source connected to a power grid as known as wall power, AC power, domestic power) such as smart lighting. This is a problem for battery powered nodes such as switches that are incorporated into the mesh network. Due to their application, Relay Nodes generally operate on standard power (i.e., non-battery power).

LPNs use the general power-saving characteristics of BLE (e.g., remaining in a sleep state for long periods) and can therefore operate for long periods on battery power. Each LPN is connected to a standard powered Friend Node, which remains in an active, or awake, mode and caches any messages directed to the LPN. When the LPN enters a receive mode (according to a predetermined schedule), it polls the Friend Node for any messages stored in the Friend Node's cache. The Friend Node sends all of the cached messages to the LPN (referred to as response messages), which operates as instructed and then returns to a power-saving sleep mode. A Friend node can be friends with multiple LPN's.

Proxy Nodes can allow for legacy devices to operate on a mesh network. For example, when a consumer wishes to use a legacy smartphone to control smart lighting via the mesh network. Proxy nodes will generally be a legacy implementation which does not have support for sending advertisement packets by any profile. Proxy nodes will have Generic Attribute Profile (GATT) connection support. This GATT bearer exists for legacy devices. The Proxy nodes which only have GATT support will create a proxy connection with Proxy servers. Proxy servers have both GATT and advertisement bearer support. When Proxy nodes want to send communications to other nodes, the Proxy nodes send communications over a GATT bearer to a Proxy server. The Proxy servers will relay the communications on advertisement bearers and GATT bearers on to other nodes.

In reference to FIG. 2, the thermostat 210 (battery powered) can be an example of an LPN and the bedroom speaker 212 and/or the television 228 (if standard powered) can be examples of Friend Nodes. In another example, the clock 216 (battery powered) can be an LPN and the refrigerator 218 (standard powered) can be a Friend Node. In another example, the refrigerator 218, the television 228, and the laundry machine 214, for example, can be Relay Nodes, as they are all standard powered. The outdoor speakers 204 and 206, the bedroom speaker 212, and the family room speaker 250 can also be Relay Nodes even if not standard powered.

Figure 5:
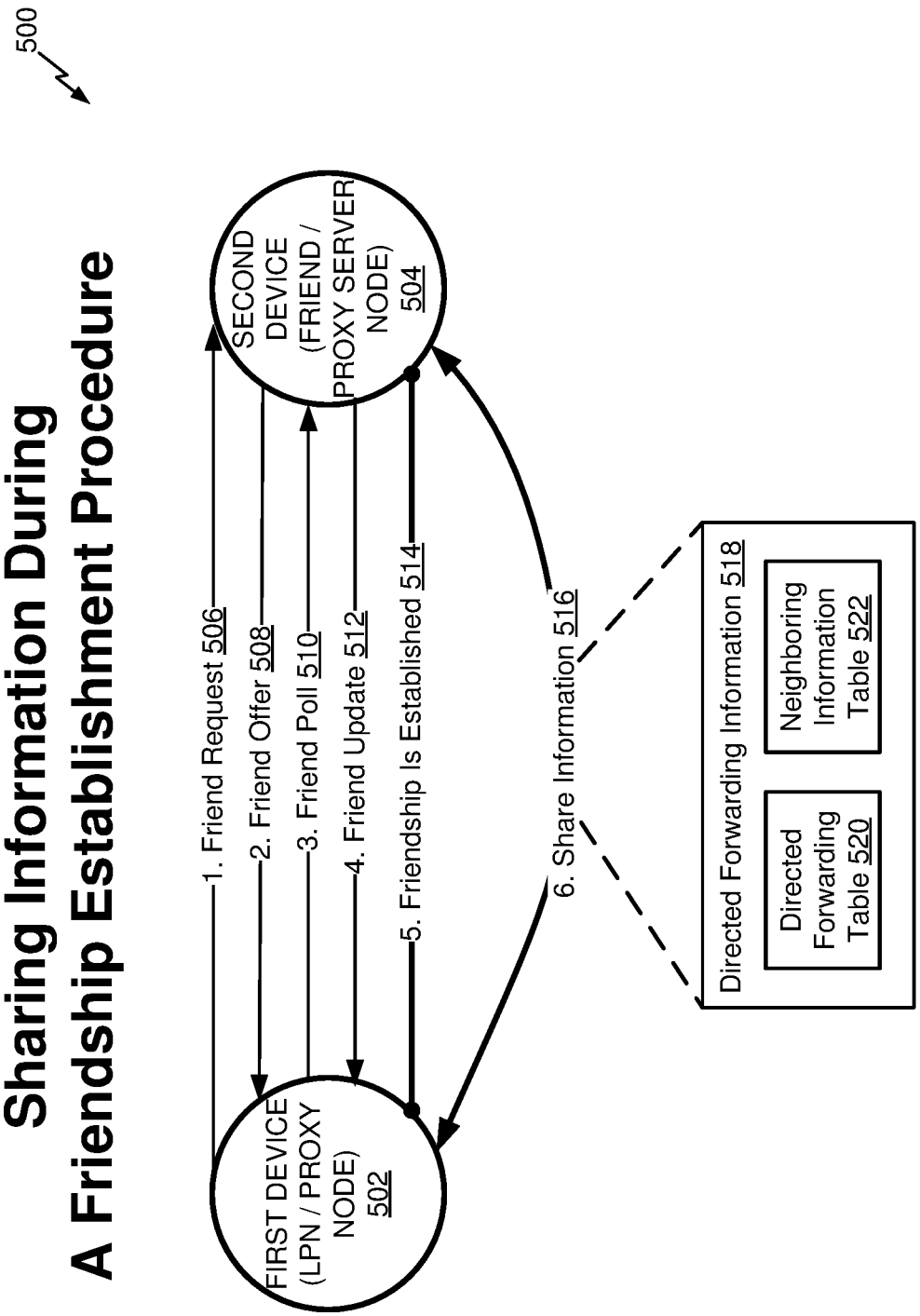
FIG. 5 is a block diagram illustrating examples of a first device and a second device sharing information during a friendship establishment procedure.

FIG. 5 is a block diagram illustrating examples of a first device 502 and a second device 504 sharing information 516 during a friendship establishment procedure 514. The first device 502 can be a low power node (LPN) and/or proxy node and the second device 504 can be a friend node and/or a proxy server node depending on the node configurations. The first device 502 and second device 504 can implementations of nodes 102 shown in FIG. 1.

In one implementation, the first device 502 is an LPN and the second device 504 is a Friend node. The LPN node 502 broadcasts a Friend Request message 506 to all potential Friend Nodes including Friend node 504. The potential Friend node 504 can be nearby (i.e., within wireless communication range) nodes in the same wireless mesh network (e.g., wireless mesh network 100). The Friend Request message 506 is received by all Friend nodes within radio range that support the Friend feature. The Friend Request message 506 includes a number of parameters that outline the requirements that any potential Friend node needs to support. The LPN 502 receives a Friend Offer message 508 from the potential Friend node 504. The Friend Offer message 508 includes information about the capabilities of the offering node such as Friend node 504. The LPN 502 can use this information to decide which offer to accept and establish a friendship with the Friend node. In response, the LPN 502 sends a Friend Poll message 510 to its selected Friend node 504. The LPN 502 receives a Friend Update message 512 from Friend node 504. At this point, the friendship is established 514 between the LPN 502 and Friend node 504. The friendship can define timing parameters that are static for the duration of a friend relationship between an LPN and a Friend node. For example, the timing parameters can be ReceiveDelay, ReceiveWindow, PollTimeout, and other related parameters.

The LPN 502 and the Friend node 504 can share information 516 between the two nodes. The LPN 502 can request that the Friend node 504 provide any type of information to be sent to the LPN 502. The Friend node 504 can also independently send the LPN 502 any type of information. The Friend node 504 can also share information 516 with other nodes independently and/or based on instructions from the LPN 502.

In one implementation, the LPN 502 requests that the Friend node 504 send directed forwarding information 518 to the LPN 502. The LPN 502 can store the directed forwarding information 518 and/or send the directed forwarding information 518 to a new Friend node, any other type of node, and/or a network device. The directed forwarding information 518 can be any type of information that can be transmitted and/or stored. In one implementation, the directed forwarding information 518 can include a directed forwarding table 520, neighboring information table 522, and/or related tables and information.

The directed forwarding table 520 can be a table that includes any type of information. In an implementation, the directed forwarding table 520 is also known as a "forwarding table" and can include, but not limited to, detailed information regarding nodes, node addresses, node types, node configurations, network destination paths, node destination paths, broadcast addresses, unicast addresses, network addresses, network measurements, network performance, node performance, network configuration, network historical information, node historical information, and related directed forwarding information. In one example, the directed forwarding table 520 can be structured and contain at least a portion of the fields and descriptions shown in the directed forwarding table 520 listed below.

Directed Forward Table 520 (Forwarding Table) Example:

| Field | Size (bits) | Notes |
|---|---|---|
| Fixed | 1 | Flag indicating whether or not the path is fixed. |
| Backward_Path_Validated | 1 | Flag indicating whether or not the backward path is validated, that is, the Path Originator confirmed the path establishment. |
| Proactive_Path_Updated | 1 | Flag indicating whether or not the entry has been updated by a received NEIGHBOR_INFO message. |
| Path_Orig_Path_Metric_Type | 3 | (Path Originator Path_Metric_Type) Path_Metric_Type used to calculate the path metric of a path toward the Path Originator, if the Path Originator is present; otherwise, set to the 0 and ignored. |

-continued

| Field | Size (bits) | Notes |
|---|---|---|
| \multicolumn{3}{c}{Directed Forward Table 520 (Forwarding Table) Example:} |
| RFU | 2 | Reserved for Future Use |
| Path_Orig | 16 | (Path Originator) Primary unicast address of the Path Originator, if the Path Originator is present; otherwise, set to the unassigned address and ignored. |
| Path_Orig_Addr_Range | 8 | (Path Originator Secondary Address Range) Range of up to 254 secondary element addresses known to be assigned to the Path Originator; otherwise, set to 0. |
| Dependent_Orig_List | variable (16 * N1) | List of Dependent Originator primary unicast addresses. Each list entry has a corresponding Dependent_Orig_Addr_Range_List entry. N1 is the size of the Dependent_Orig_List. |
| Dependent_Orig_Addr_Range_List | variable (8 * N1) | List of ranges of up to 254 secondary addresses known to be assigned to the corresponding Dependent Originators. Each list entry has a corresponding Dependent_Orig_List entry. If the corresponding Dependent_Orig_List entry does not have any secondary addresses, the corresponding Dependent_Orig_Addr_Range_List entry is set to 0. N1 is the size of the Dependent_Orig_List. |
| Path_Dst | 16 | (Path Destination) Primary unicast address of the Path Destination. |
| Path_Dst_Addr_Range | 8 | (Path Destination Secondary Address Range) Range of up to 254 secondary element addresses known to be assigned to the Path Destination; otherwise, set to 0. |
| Dependent_Dst_List | variable (16 * N2) | List of Dependent Destination primary unicast addresses. Each list entry has a corresponding Dependent_Dst_Addr_Range_List entry. N2 is the size of the Dependent_Dst_List. |
| Dependent_Dst_Addr_Range_List | variable (8 * N2) | List of ranges of up to 254 secondary addresses known to be assigned to the corresponding Dependent Destinations. Each list entry has a corresponding Dependent_Dst_List entry. If the corresponding Dependent_Dst_List entry does not have any secondary addresses, the corresponding Dependent_Dst_Addr_Range_List entry is set to 0. N2 is the size of the Dependent_Dst_List. |
| Forwarding_Number | 8 | (Forwarding Number) Last Forwarding Number known to have been generated by the Path Originator or the Path Destination; if the entry is associated with a fixed path, it is set to 0 and ignored. |
| Path_Dst_Hop_Count | 8 | (Path Destination Hop Count) Hop count from the Path Destination, if the Forwarding Table entry is associated with a non-fixed path; otherwise, set to 0 and ignored. The field value is greater than 0 only if the Path Destination is in the neighborhood and the Path Originator is not present. |

Directed Forward Table 520 (Forwarding Table) Example:

| Field | Size (bits) | Notes |
|---|---|---|
| Lane_Counter | 8 | Number of lanes discovered. Set to 1 if the path is fixed. |
| Bearer_Toward_Path_Originator | 8 | Bearer index to be used for forwarding messages directed to the Path Originator, if the node is not the Path Originator; otherwise, set to the unassigned bearer index and ignored. |
| Bearer_Toward_Path_Destination | 8 | Bearer index to be used for forwarding messages directed to the Path Destination, if the node is not the Path Destination; otherwise, set to the unassigned bearer index and ignored. |
| Subscription_List | variable (16 * N5) | List of group addresses and virtual addresses that the Path Destination and any Dependent Destinations are subscribed to. This is a subset of the node's Subscription_List state containing only group addresses and virtual addresses discovered by the directed forwarding functionality. N5 is the size of the Subscription_List. |

The neighboring information table 522 can a table that includes any type of information. In an implementation, the neighboring information table 522 can include, but not limited to, detailed information regarding neighboring nodes, node addresses, node measurements, node types, node configurations, node destination paths, network addresses, network measurements, network performance, network configuration, node performance, network historical information, node historical information, and related information. In one example, the neighboring information table 522 can be structured and contain at least a portion of the fields and descriptions shown in the neighboring information table 522 listed below.

Neighboring Information Table 522 Example:

| Field | Size (bits) | Notes |
|---|---|---|
| Neighbor_Flag | 1 | Flag indicating whether the node identified by the Neighbor_Addr field is considered a neighbor or not. |
| Neighbor_Addr | 15 | Lower 15 bits of the primary unicast address of the node's neighbor. |
| Average_RSSI | 8 | The average RSSI measured upon receiving messages originated by the node's neighbor. |

Figure 6:
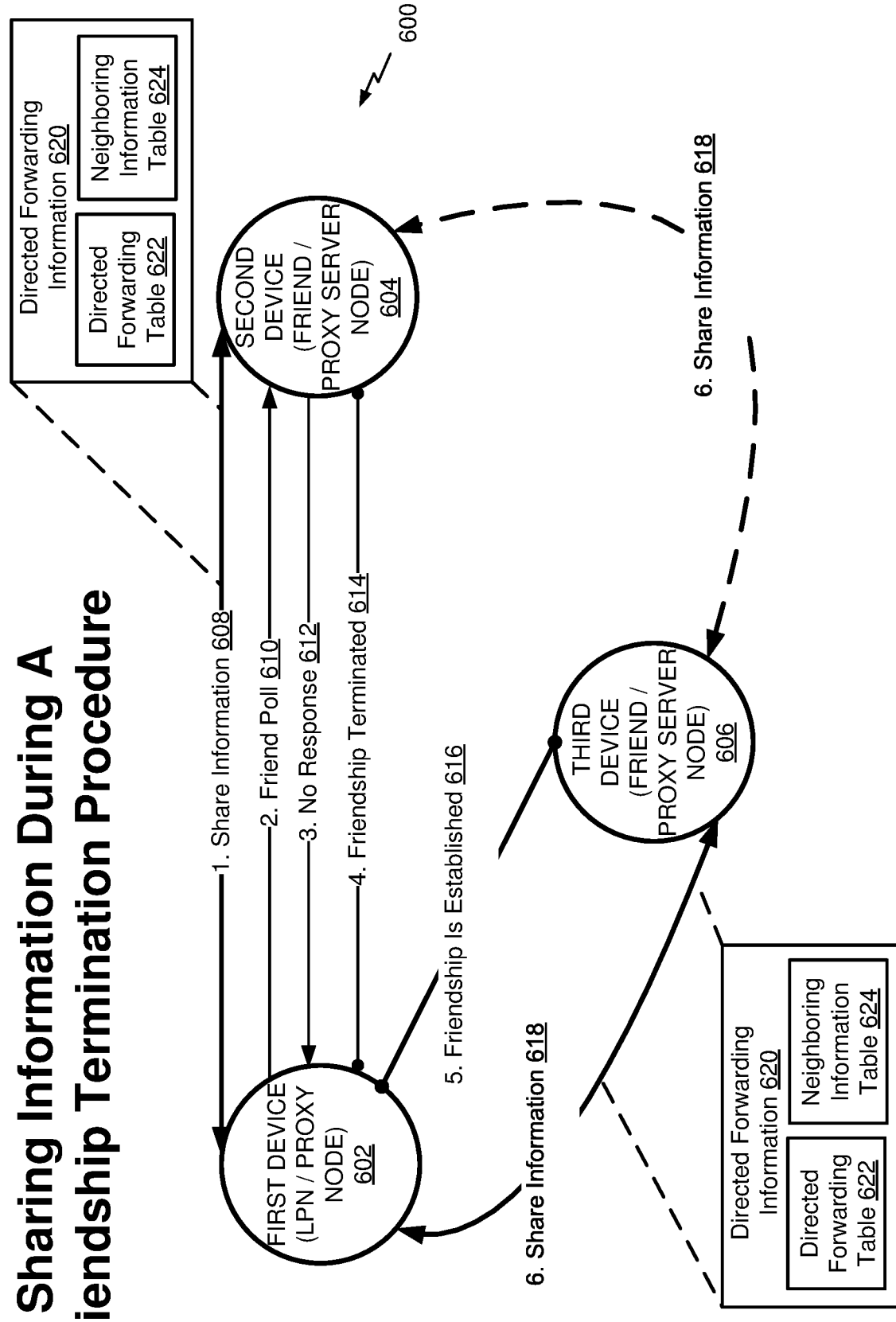
FIG. 6 is a block diagram illustrating examples of a first device, second device, and third device sharing information during a friendship termination procedure.

FIG. 6 is a block diagram illustrating examples of a first device 602, second device 604, and third device 606 sharing information 608 and 618 during a friendship termination procedure 616. The first device 602 can be a low power node (LPN) and/or proxy node. The second device 604 and/or third device 606 can be friend nodes and/or proxy server nodes depending on the node configurations. The first device 602, second device 604, and third device 606 can be implementations of nodes 102 shown in FIG. 1.

In one implementation, the first device 602 is an LPN, the second device 604 is a Friend node, and the third device 606 is a Friend node. In this implementation, the LPN 602 has an established friendship with the Friend node 604. The LPN 602 and the Friend node 604 can share information 608 between the two nodes. The LPN 602 can request that the Friend node 604 provide any type of information to the LPN 602. For example, the LPN 602 and Friend node 604 can share the directed forwarding information 620 which can include the directed forwarding table 622 and neighboring information table 624. The Friend node 604 can also independently send the LPN 602 any type of information. The Friend node 604 can also share information 608 with other nodes independently and/or based on instructions from the LPN 602.

The LPN 602 sends at least one Friend Poll message 610 to the Friend node 604 to ensure that the Friend node 604 is active. The LPN 602 can be configured to wait to receive a response message from the Friend node 604 based on different criteria including a timer, non-received message counter, failing to receive a response 614 after a specific number of sent messages, and related criteria. For example, if the LPN 602 does not receive a response 612 at all from the Friend node 604 after the LPN 602 sends at least one Friend Poll message 610, then the LPN 602 can determine that the Friendship is terminated 614. In another example, the LPN 602 does not receive a response 612 to the Friend Poll message 610 after one minute, then the LPN 602 can determine that the Friendship is terminated 614.

At this point, the LPN 602 can request that the Friend node 604 send the directed forwarding information 620 including the directed forwarding table 622, the neighboring information table 624, and related information to the LPN 602 for storage and/or archiving. The LPN 602 can store the directed forwarding information 620 and later access it to send it to any node and/or network device. The LPN 602 can also use the directed forwarding information 620 to update its own internal information. For example, the LPN 602 can take the directed forwarding table 622 and neighboring information table 624 received from the Friend node 604 and update at least a portion of the directed forwarding table 622 and/or neighboring information table 624 it has stored.

After the friendship is terminated 614 between the LPN 602 and the Friend node 604, the LPN 602 will attempt to establish a friendship with another node. The LPN 602 will go through the Friend Establishment procedure 616 as further detailed in FIG. 5. In one implementation, as shown in FIGS. 5 and 6, the LPN 602 broadcasts a Friend Request message 506 to all potential Friend Nodes including Friend node 606. The Friend Request message 506 is received by all Friend nodes within radio range that support the Friend feature. The LPN 602 receives a Friend Offer message 508 from the potential Friend node 606. In response, the LPN 602 sends a Friend Poll message 510 to its selected Friend node 606. The LPN 602 receives a Friend Update message 512 from the Friend node 606 and the friendship is established 616 between the LPN 602 and Friend node 606.

At this point, the LPN 602 and the Friend node 606 can share information 618 between the two nodes. For example, the LPN 602 and Friend node 604 can share the directed forwarding information 620 which can include the directed forwarding table 622 and neighboring information table 624.

The LPN 602 can directly share information 618 with the Friend node 602. The LPN 602 can also direct the previous Friend node 604 to share information 618 (dotted line) with Friend node 606. In one implementation, the LPN 602 accesses the directed forwarding information 620 stored on the LPN 602 and then sends the directed forwarding information 620 to the Friend node 606. In another implementation, the LPN 602 directs the previous Friend node 604 to share information 618 (dotted line) with the Friend node 606. The previous Friend node 604 can then send the directed forwarding information 620 including the directed forwarding table 622, neighboring information table 624, and/or any other related information to the Friend node 606.

In either implementation, the Friend node 606 can use the directed forwarding information 620 and related information to update its own internal information. For example, the Friend node 606 can take the directed forwarding table 622 and neighboring information table 624 received from the LPN 602 and/or previous Friend node 604 and update at least a portion of the directed forwarding table 622 and/or neighboring information table 624 it has stored.

Figure 7:
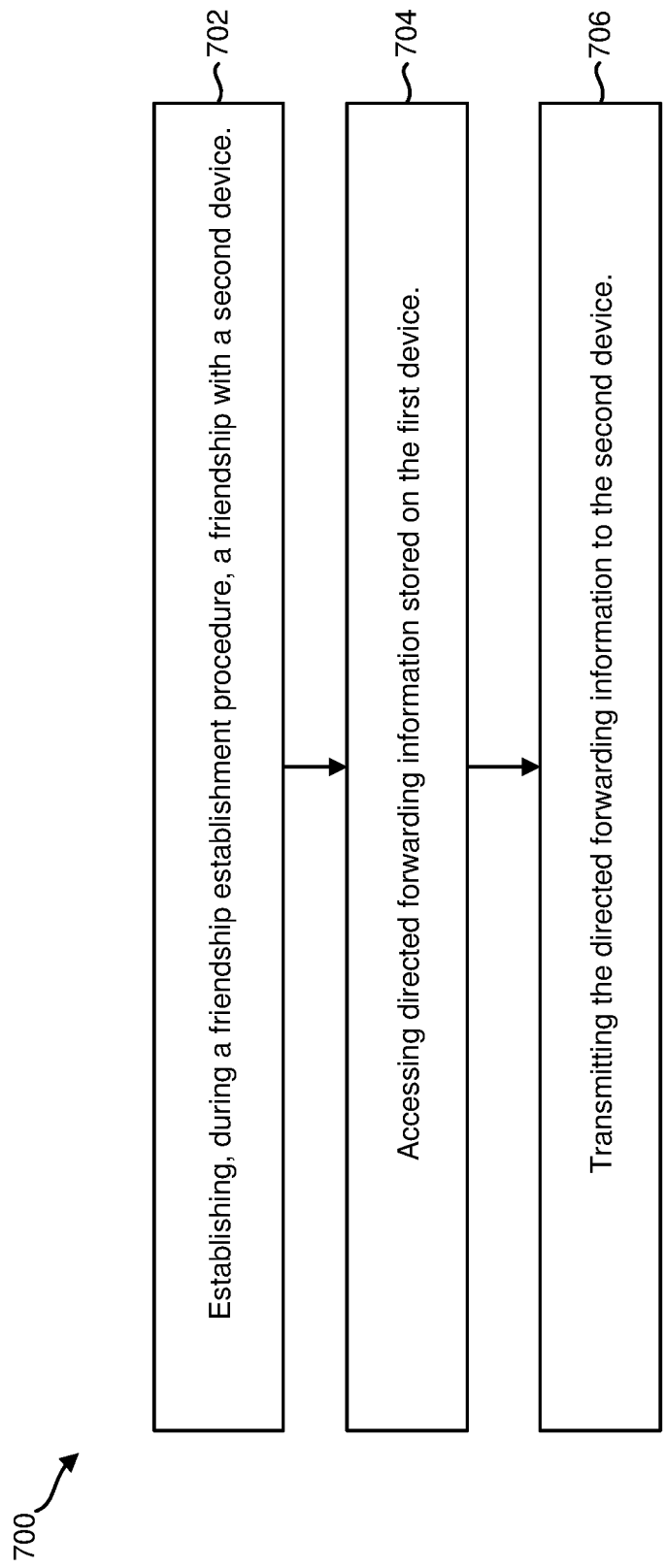
FIG. 7 is a flow diagram illustrating a method for directed forwarding information sharing between devices during a friendship establishment procedure.

FIG. 7 is a flow diagram illustrating a method for directed forwarding information sharing between devices during a friendship establishment procedure. Referring to FIGS. 1 and 5, this method 700 can be implemented by the first device 502 establishing a friendship with a second device 504.

At step 702, the first device 502 establishes a friendship with a second device 504 during a friendship establishment procedure. The operations of 702 can be performed according to the methods described herein. In some implementations, the operations of 702 can be performed by the first device and second device as described with reference to FIG. 5.

At step 704, the first device 502 accesses directed forwarding information 518 stored on the first device 502. The operations of 702 can be performed according to the methods described herein. In some implementations, the operations of 704 can be performed by the first device and second device as described with reference to FIG. 5.

At step 706, the first device 502 transmits the directed forwarding information 518 to the second device 504. The operations of 702 can be performed according to the methods described herein. In some implementations, the operations of 706 can be performed by the first device and second device as described with reference to FIG. 5.

Figure 8:
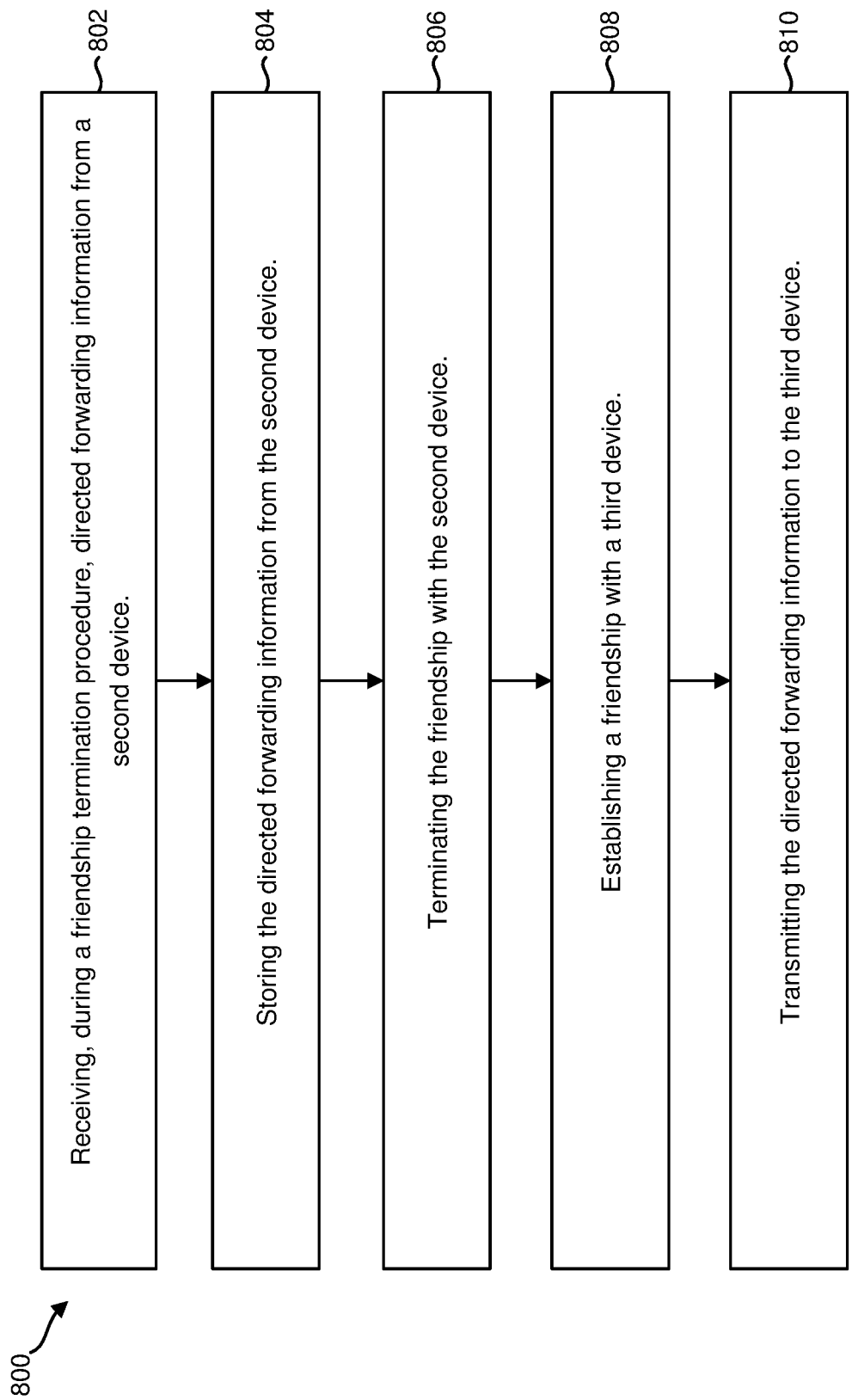
FIG. 8 is a flow diagram illustrating a method for directed forwarding information sharing between devices during a friendship termination procedure.

FIG. 8 is a flow diagram illustrating a method for directed forwarding information sharing between devices during a friendship termination procedure. Referring to FIGS. 1, 5, and 6 this method 700 can be implemented by the first device 602 terminating a friendship with a second device 604 and establishing a new friendship with a third device 606. This method 700 incorporates the detailed description and methods of FIG. 6 as to the steps of terminating a friendship as applied to the first device 602 terminating a friendship with the second device 604 (i.e., FIG. 6 detailed first device 602 terminating a friendship with the second device 604) in this method 700. This method 700 incorporates the detailed description and methods of FIG. 5 as to the steps of establishing a friendship as applied to the first device 602 establishing a friendship with the third device 606 (i.e., FIG. 5 detailed first device 502 establishing a friendship with the second device 504) in this method 700.

At step 802, the first device 602 receives directed forwarding information 620 from a second device 604 during a friendship termination procedure. The operations of 802 can be performed according to the methods described herein. In some implementations, the operations of 802 can be performed by the first device 602 and second device 604 as described with reference to FIG. 6.

At step 804, the first device 602 stores the directed forwarding information 620 from the second device 604. The operations of 804 can be performed according to the methods described herein. In some implementations, the operations of 804 can be performed by the first device 602 and second device 604 as described with reference to FIG. 6.

At step 806, the first device 602 terminates the friendship 614 with the second device 604. The operations of 806 can be performed according to the methods described herein. In some implementations, the operations of 806 can be performed by the first device 602 and second device 604 as described with reference to FIG. 6.

At step 808, the first device 602 establishes a friendship 616 with a third device 606. The operations of 808 can be performed according to the methods described herein. In some implementations, the operations of 808 can be performed by the first device and second device as described with reference to FIGS. 5 and 6.

At step 810, the first device 602 transmits the directed forwarding information 620 to the third device 606. The operations of 810 can be performed according to the methods described herein. In some implementations, the operations of 810 can be performed by the first device 602 and third device 606 as described with reference to FIGS. 5 and 6.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for establishing an encrypted connection between a first node and a second node in a wireless mesh network.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for wireless communications in a Bluetooth mesh network at a first device, comprising:
   receiving, during a friendship termination procedure, directed forwarding information from a second device;
   storing the directed forwarding information from the second device;
   terminating the friendship with the second device;
   establishing a friendship with a third device;
   transmitting the directed forwarding information to the third device;
   wherein the directed forwarding information includes at least a directed forwarding table and a neighboring information table;
   wherein the directed forwarding table includes node types, node configurations, network destination paths, and node destination paths; and
   wherein the neighboring information table includes neighboring nodes measurements, neighboring nodes types, neighboring nodes configurations, and neighboring nodes destination paths.

2. The method of claim 1, wherein the first device is a low power node (LPN) or a proxy node.

3. The method of claim 1, wherein the second device is a friend node or a proxy server node.

4. The method of claim 1, wherein the third device is a friend node or a proxy server node.

5. The method of claim 1, wherein the storing the directed forwarding information from the second device includes updating at least a portion of a directed forwarding table and at least a portion of a neighboring information table stored in the first device.

6. The method of claim 1, wherein the terminating the friendship with the second device includes:
   transmitting at least one friend poll message to the second device; and
   receiving no response to the at least one friend poll message from the second device.

7. The method of claim 1, wherein the establishing a friendship with a third device includes:
   transmitting a friend request message to the third device;
   receiving a friend offer message from the third device;
   transmitting a friend poll message to the third device; and
   receiving a friend update message from the third device.

8. The method of claim 1, wherein the second device, that was in previous friendship with the first device, can transmit the directed forwarding information to the third device.

9. A method for wireless communications in a Bluetooth mesh network at a first device, comprising:
   establishing, during a friendship establishment procedure, a friendship with a second device;
   accessing directed forwarding information stored on the first device;
   transmitting the directed forwarding information to a second device;
   wherein the transmitting the directed forwarding information to the second device includes transmitting at least a portion of a directed forwarding table and at least a portion of a neighboring information table stored in the first device;
   wherein the at least a portion of the directed forwarding table includes node types, node configurations, network destination paths, and node destination paths; and
   wherein the at least a portion of the neighboring information table includes neighboring nodes measurements, neighboring nodes types, neighboring nodes configurations, and neighboring nodes destination paths.

10. The method of claim 9, wherein the first device is a low power node (LPN) or a proxy node.

11. The method of claim 9, wherein the second device is a friend node or a proxy server node.

12. The method of claim 9, wherein the establishing a friendship with the second device includes:
transmitting a friend request message to the second device;
receiving a friend offer message from the second device;
transmitting a friend poll message to the second device; and
receiving a friend update message from the second device.

13. A first device for wireless communications in a Bluetooth mesh network, comprising:
a memory; and
at least one processor coupled to the memory and configured to:
receiving, during a friendship termination procedure, directed forwarding information from a second device;
storing the directed forwarding information from the second device;
terminating the friendship with the second device;
establishing a friendship with a third device;
transmitting the directed forwarding information to the third device;
wherein the directed forwarding information includes at least a directed forwarding table and a neighboring information table;
wherein the directed forwarding table includes node types, node configurations, network destination paths, and node destination paths; and
wherein the neighboring information table includes neighboring nodes measurements, neighboring nodes types, neighboring nodes configurations, and neighboring nodes destination paths.

14. The first device of claim 13, wherein the first device is a low power node (LPN) or a proxy node.

15. The first device of claim 13, wherein the second device is a friend node or a proxy server node.

16. The first device of claim 13, wherein the third device is a friend node or a proxy server node.

17. The first device of claim 13, wherein the storing the directed forwarding information from the second device includes updating at least a portion of a directed forwarding table and at least a portion of a neighboring information table stored in the first device.

18. The first device of claim 13, wherein the terminating the friendship with the second device includes:
transmitting at least one friend poll message to the second device; and
receiving no response to the at least one friend poll message from the second device.

19. The first device of claim 13, wherein the establishing a friendship with a third device includes:
transmitting a friend request message to the third device;
receiving a friend offer message from the third device;
transmitting a friend poll message to the third device; and
receiving a friend update message from the third device.

20. The first device of claim 13, wherein the second device, that was in previous friendship with the first device, can transmit the directed forwarding information to the third device.

21. A first device for wireless communications in a Bluetooth mesh network, comprising:
a memory; and
at least one processor coupled to the memory and configured to:
establishing, during a friendship establishment procedure, a friendship with a second device;
accessing directed forwarding information stored on the first device;
transmitting the directed forwarding information to a second device;
where in the directed forwarding information includes at least a directed forwarding table and a neighboring information table;
wherein the directed forwarding table includes node types, node configurations, network destination paths, and node destination paths; and
wherein the neighboring information table includes neighboring nodes measurements, neighboring nodes types, neighboring nodes configurations, and neighboring nodes destination paths.

22. The first device of claim 21, wherein the first device is a low power node (LPN) or a proxy node.

23. The first device of claim 21, wherein the second device is a friend node or a proxy server node.

24. The first device of claim 21, wherein the establishing a friendship with the second device includes:
transmitting a friend request message to the second device;
receiving a friend offer message from the second device;
transmitting a friend poll message to the second device; and
receiving a friend update message from the second device.

25. A first device for wireless communications in a Bluetooth mesh network, comprising:
means for receiving, during a friendship termination procedure, directed forwarding information from a second device;
means for storing the directed forwarding information from the second device;
means for terminating the friendship with the second device;
means for establishing a friendship with a third device;
means for transmitting the directed forwarding information to the third device;
wherein the directed forwarding information includes at least a directed forwarding table and a neighboring information table;
wherein the directed forwarding table includes node types, node configurations, network destination paths, and node destination paths; and
wherein the neighboring information table includes neighboring nodes measurements, neighboring nodes types, neighboring nodes configurations, and neighboring nodes destination paths.

26. A first device for wireless communications in a Bluetooth mesh network, comprising:
means for establishing, during a friendship establishment procedure, a friendship with a second device;
means for accessing directed forwarding information stored on the first device;
means for transmitting the directed forwarding information to a second device;
where in the directed forwarding information includes at least a directed forwarding table and a neighboring information table;
wherein the directed forwarding table includes node types, node configurations, network destination paths, and node destination paths; and
wherein the neighboring information table includes neighboring nodes measurements, neighboring nodes types, neighboring nodes configurations, and neighboring nodes destination paths.

27. A non-transitory computer-readable medium storing code for wireless communication in a Bluetooth mesh network at a first device, the code comprising instructions executable by a processor to:
- receiving, during a friendship termination procedure, directed forwarding information from a second device;
- storing the directed forwarding information from the second device;
- terminating the friendship with the second device;
- establishing a friendship with a third device;
- transmitting the directed forwarding information to the third device;
- wherein the directed forwarding information includes at least a directed forwarding table and a neighboring information table;
- wherein the directed forwarding table includes node types, node configurations, network destination paths, and node destination paths; and
- wherein the neighboring information table includes neighboring nodes measurements, neighboring nodes types, neighboring nodes configurations, and neighboring nodes destination paths.

28. A non-transitory computer-readable medium storing code for wireless communication in a Bluetooth mesh network at a first device, the code comprising instructions executable by a processor to:
- establishing, during a friendship establishment procedure, a friendship with a second device;
- accessing directed forwarding information stored on the first device;
- transmitting the directed forwarding information to a second device; and
- wherein the directed forwarding information includes at least a directed forwarding table and a neighboring information table;
- wherein the directed forwarding table includes node types, node configurations, network destination paths, and node destination paths; and
- wherein the neighboring information table includes neighboring nodes measurements, neighboring nodes types, neighboring nodes configurations, and neighboring nodes destination paths.

* * * * *